United States Patent
Suzuki (10) Patent No.: US 7,929,521 B2
(45) Date of Patent: Apr. 19, 2011

(54) IP TELEPHONE DEVICE

(75) Inventor: Satoshi Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 225 days.

(21) Appl. No.: 12/406,984

(22) Filed: Mar. 19, 2009

(65) Prior Publication Data
US 2009/0238352 A1      Sep. 24, 2009

(30) Foreign Application Priority Data

Mar. 24, 2008   (JP) ................................. 2008-076319

(51) Int. Cl.
    *H04L 12/56*    (2006.01)
(52) U.S. Cl. ........................................ 370/352; 379/142
(58) Field of Classification Search .................. 370/352; 379/142, 88, 211, 201; 455/414; 709/224, 709/204

See application file for complete search history.

(56) References Cited

U.S. PATENT DOCUMENTS

| | | | |
|---|---|---|---|
| 5,867,494 A * | 2/1999 | Krishnaswamy et al. .... | 370/352 |
| 6,738,461 B2 * | 5/2004 | Trandal et al. ............ | 379/142.02 |
| 6,826,173 B1 * | 11/2004 | Kung et al. ................ | 370/352 |
| 6,985,943 B2 * | 1/2006 | Deryugin et al. ............ | 709/224 |
| 7,308,081 B2 * | 12/2007 | Trandal et al. ............. | 379/88.12 |
| 7,508,927 B1 * | 3/2009 | Trandal et al. ............. | 379/142.02 |
| 2004/0203660 A1 * | 10/2004 | Tibrewal et al. ........... | 455/414.1 |
| 2006/0177034 A1 * | 8/2006 | Reding et al. ............. | 379/211.02 |
| 2007/0050448 A1 * | 3/2007 | Gonen et al. .................. | 709/204 |
| 2008/0155660 A1 * | 6/2008 | Sharma ............................ | 726/4 |
| 2008/0159503 A1 * | 7/2008 | Helbling et al. .......... | 379/142.17 |
| 2009/0022293 A1 * | 1/2009 | Routt ........................ | 379/201.02 |

FOREIGN PATENT DOCUMENTS

| EP | 0 999 683 | 5/2000 |
|---|---|---|
| EP | 1768345 A2 | 3/2007 |
| JP | 2001-024813 | 1/2001 |
| JP | 2001-177604 | 6/2001 |

OTHER PUBLICATIONS

EP Search Report dtd Jul. 27, 2009, EP appln. 09250768.0.

* cited by examiner

*Primary Examiner* — Thong H Vu
(74) *Attorney, Agent, or Firm* — Banner & Witcoff, Ltd.

(57) ABSTRACT

An IP telephone device may be configured to obtain identification information of each of a plurality of receiver devices, create text data including the identification information of each of the plurality of receiver devices, receive a call request, send the text data to a sender of the call request, receive at least one identification information selected in the sender of the call request in accordance with the text data, send a first call request notice instruction to a receiver device corresponding to the received identification information, transfer voice data sent from the receiver device which has been a destination of the first call request notice instruction to the sender of the call request, and transfer voice data sent from the sender of the call request to the receiver device which has been the destination of the first call request notice instruction.

8 Claims, 7 Drawing Sheets

IP TELEPHONE DEVICE

CROSS-REFERENCE TO RELATED APPLICATION

This application claims priority to Japanese Patent Application No. 2008-076319, filed on Mar. 24, 2008, the contents of which are hereby incorporated by reference into the present application.

BACKGROUND OF THE INVENTION

1. Field of the Invention

The present invention relates to an IP telephone device that carries out telephone communications using an IP telephone network, and more particularly to an IP telephone device that performs a call request notice upon receiving a call request that has been sent from another telephone device. It should be noted that the terminology "call request notice" shall be interpreted in its broadest sense, and is a concept including a variety of possible techniques for notifying a user that a call request has been received. For example, outputting a sound (ringing), vibrating, displaying a prescribed message, or changing the lighting pattern of a lamp may be referred to as examples of the "call request notice".

2. Description of the Related Art

EP0999683A2 discloses a system in which a facsimile device and a plurality of handset devices exist inside a single extension network. The facsimile device, upon receiving a call request, sends a call request notice instruction to a handset device that is not in use (an idle handset device). It is thereby possible to ring the idle handset device.

SUMMARY OF THE INVENTION

In the above prior art system, the same action (i.e. the idle handset device rings) is exhibited regardless of the intention of the caller. That is, in the prior art system mentioned above, it is not possible to execute a call request notice that reflects the intention of the caller. This specification provides a telephone device that makes it possible to execute a call request notice that reflects the intention of the caller.

One technology disclosed in this specification is an IP telephone device that executes a call request using an IP telephone network. This IP telephone device may comprise an identification information obtaining device, a text data creation device, a call request receiving device, a text data receiving device, a first identification information receiving device, a first call request notice instruction sending device, and a first voice data transferring device.

The identification information obtaining device may be configured to obtain identification information of each of a plurality of receiver devices. For example, a user may input the identification information of each receiver device into the IP telephone device. In so doing, the identification information obtaining device may also be called a device for allowing a user to input the identification information of each receiver device (for example, a user-operated operating device). Further, for example, as will be described hereinbelow, the identification information obtaining device may obtain the identification information of each receiver device existing in the area surrounding the IP telephone device by carrying out wireless communications. Furthermore, "identification information" is a concept including all sorts of information that makes it possible to identify a receiver device. An address described using the URI format, a MAC address, an IP address, a username, and so forth may be used as the "identification information".

The text data creation device may be configured to create text data including the identification information of each of the plurality of receiver devices. The call request receiving device may be configured to receive a call request. The text data sending device may be configured to send the text data to the sender of the call request. In order to send text-formatted data, for example, the text data sending device may carry out data communications at higher speeds than when voice data, such as a voice message, is sent. The user of the sender of the call request (the caller), by viewing the text data, knows what kind of receiver device exists at the destination of the call request. The caller may select the identification information corresponding to the receiver device that the caller wishes to call in accordance with the text data (for example, may use a key operation to make a selection).

The first identification information receiving device may be configured to receive at least one piece of identification information selected in the sender of the call request in accordance with the text data. No limits are placed on the data format of the identification information received at this point. For example, the identification information may be voice data, and alternately, the identification information may also be text data. The first call request notice instruction sending device may be configured to send a first call request notice instruction to a receiver device corresponding to the identification information received by the first identification information receiving device. As a result of this, the above-mentioned receiver device may execute a predetermined call request notice. For example, the receiver device may carry out a sound notice, may display a predetermined message, or may vibrate.

When the call request notice is executed on the receiver device that has been the destination of the first call request notice instruction above, the user of this receiver device knows that a call is incoming. The user may perform a call start operation (for example, a hook key operation). In accordance therewith, the first voice data transferring device may transfer voice data sent from the receiver device that has been the destination of the first call request notice instruction to the sender of the call request, and transfers voice data sent from the sender of the above mentioned call request to the receiver device that has been the destination of the first call request notice instruction. It is thereby possible to establish a call between the sender of the call request sender and the receiver device of the destination of the first call request notice.

According to the above IP telephone device, it is possible to send the text data including the identification information of each of the plurality of receiver devices to the sender of the call request. The caller is able to select the identification information corresponding to the receiver device of the party that the caller wishes to call in accordance with the text data. In a case where the first call request notice instruction sending device sends the first call request notice instruction to the receiver device corresponding to the selected identification information, the call request notice is executed specifically on the receiver device corresponding to the selected identification information. According to this IP telephone device, it is possible to execute a call request notice that reflects the intention of the caller.

DESCRIPTION OF THE PREFERRED EMBODIMENTS

Figure 1:
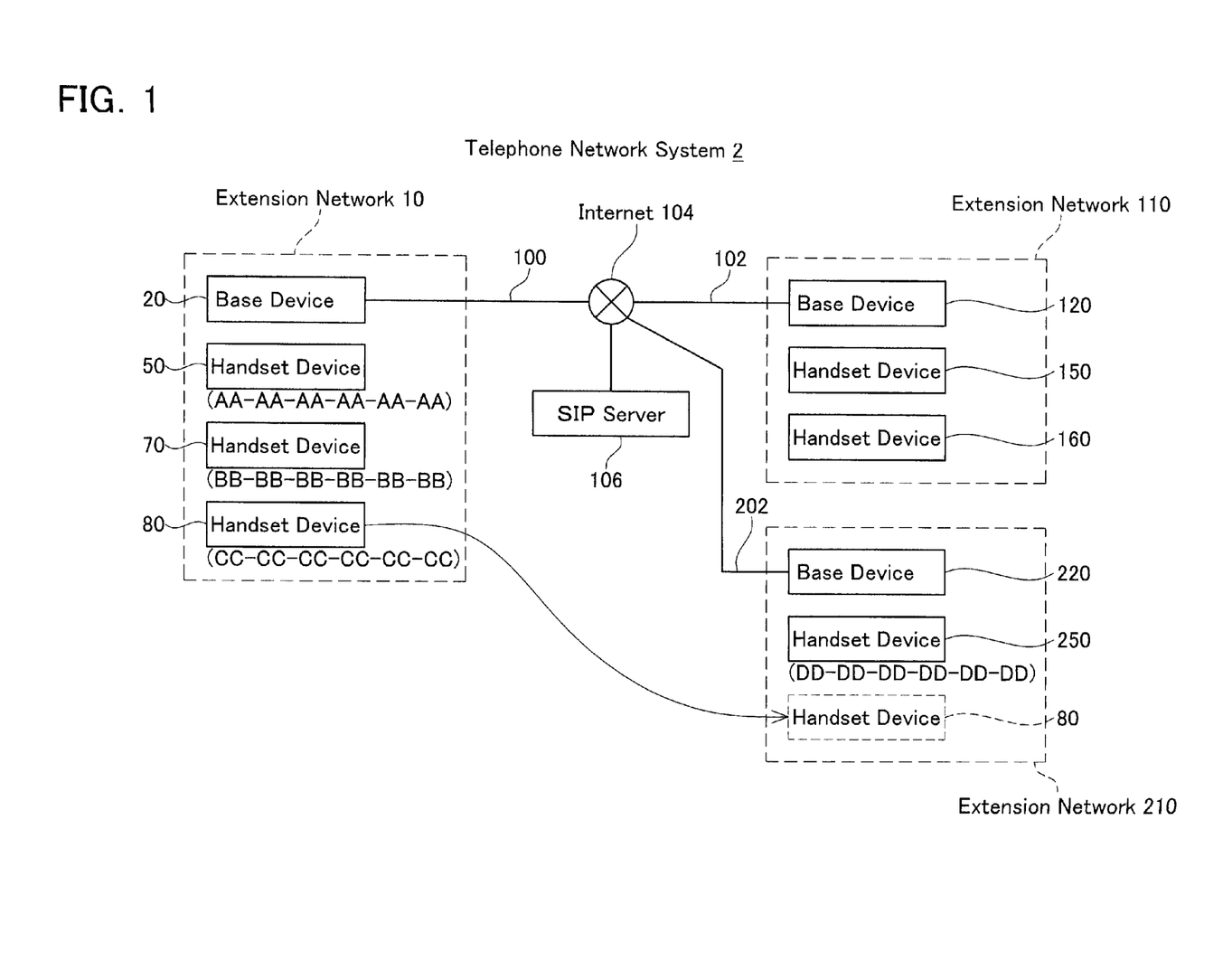
FIG. 1 shows an example of the configuration of a telephone network system.

The embodiment will be explained by referring to the drawings. FIG. 1 shows the telephone network system 2 of this embodiment. The telephone network system 2 comprises a plurality of extension networks 10, 110, 210, the Internet 104, and a SIP server 106. Only three extension networks 10, 110, 210 are shown in FIG. 1, but a large number of extension networks may actually exist.

A single SIP URI is allocated to extension network 10. Alternately, a plurality of SIP URI may be allocated to the extension network 10. Extension network 10 has a base device 20 and a plurality of handset devices 50, 70, 80. A user is able to move with the handset devices 50, 70, 80. For example, FIG. 1 shows the handset device 80 moving from the extension network 10 to the extension network 210. In accordance therewith, the handset device 80 may no longer be called a handset device configuring the extension network 10. That is, more accurately, in the state shown in FIG. 1, the handset devices 50, 70, 80 may also be described as belonging to the extension network 10. The base device 20 is connected to the Internet 104 (the IP telephone network). Each of the handset devices 50, 70, 80 configuring the extension network 10 is able to carry out telephone communication via the Internet 104. That is, the extension network 10 is an IP telephone.

Further, a single SUP URI is also allocated to extension network 110. The extension network 110 has a base device 120 and a plurality of handset devices 150, 160. The base device 120 is connected to the Internet 104. The handset devices 150, 160 configuring the extension network 110 are able to carry out telephone communications via the Internet 104. That is, the extension network 110 is an IP telephone.

Further, a single SIP URI is also allocated to the extension network 210. The extension network 210 has a base device 220 and a handset device 250. The base device 220 is connected to the Internet 104. The handset device 250 configuring the extension network 210 is able to carry out telephone communication via the Internet 104. That is, the extension network 210 is an IP telephone.

The SIP server 106 stores the SIP URI of the respective extension networks 10, 110, 210 (i.e., the telephone identification information of the respective extension networks 10, 110, 210). The SIP server 106 is connected to the Internet 104. The SIP server 106 controls the telephone communications of the respective extension networks 10, 110, 210 using the SIP. That is, for example, the various types of commands communicated between the extension network 10 and the extension network 110 in the telephone communications therebetween are sent via the SIP server 106.

(Base Device Configuration)

Figure 2:
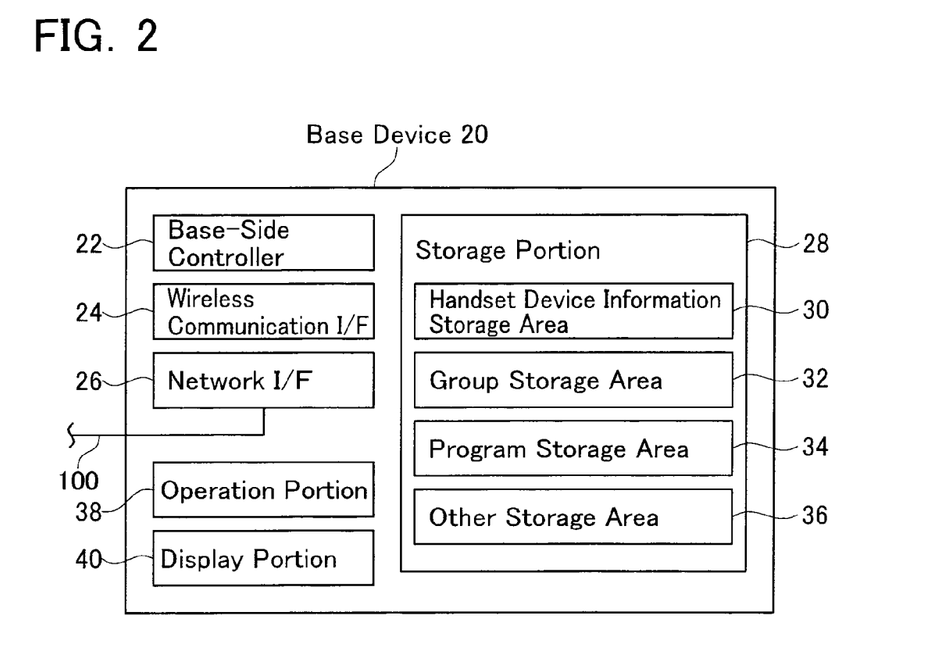
FIG. 2 shows an example of the configuration of a base device.

The configuration of the base device 20 will be explained. The base device 20 comprehensively controls the telephone communications of the respective handset devices 50, 70, 80. That is, the respective handset devices 50, 70, 80 are able to carry out telephone communications outside of the extension network 10 by way of the base device 20. FIG. 2 shows the configuration of the base device 20. The base device 20 has a base-side controller 22, a wireless communication interface 24, a network interface 26, a storage portion 28, an operation portion 38, and a display portion 40. The base-side controller 22 executes various processing in accordance with a program stored in the storage portion 28. The contents of the processing executed by the base-side controller 22 will be explained in detail below. The wireless communication interface 24 is for wireless communications with the respective handset devices 50, 70, 80. A LAN line 100 is connected to the network interface 26. The LAN line 100 is connected to the Internet 104. The base device 20 is able to access the Internet 104 via the network interface 26 and the LAN line 100.

The storage portion 28 is configured from ROM, EEPROM, RAM and so forth. The storage portion 28 has a handset device information storage area 30, a group storage area 32, a program storage area 34, and another storage area 36. The handset device information storage area 30 is able to store handset device information for each of the plurality of handset devices 50, 70, 80.

Figure 3:
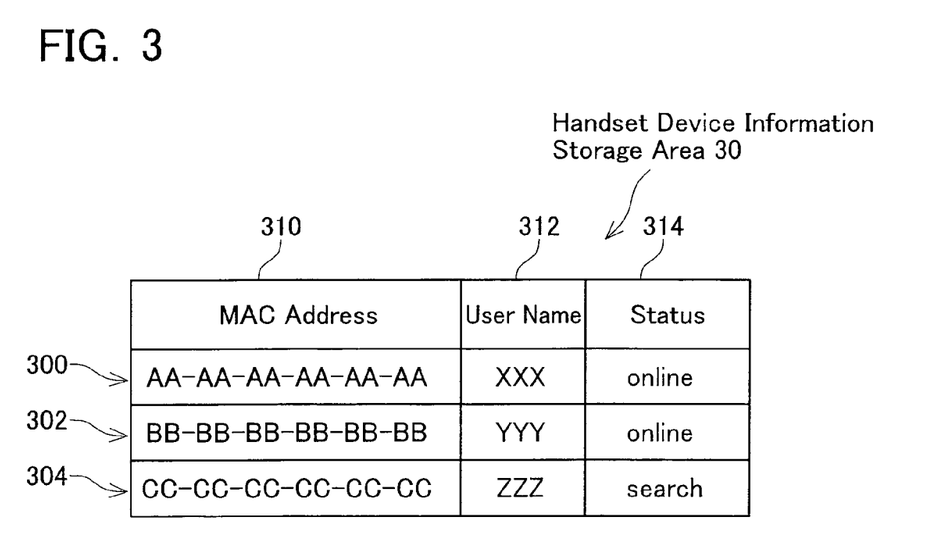
FIG. 3 shows an example of the storage contents of a handset device information storage area.

FIG. 3 shows an example of the stored contents of the handset device information storage area 30. The handset device information storage area 30 is able to store a plurality of association data 300, 302, 304. In the respective association data 300, 302, 304, a MAC address 310, a username 312 and a status 314 are associated. The MAC address 310 is an ID for identifying the handset devices 50, 70, 80. In this embodiment, the MAC address for the handset device 50 is "AA-AA-AA-AA-AA-AA". The way that the MAC address "AA . . . " is allocated to the handset device 50 is also shown in FIG. 1. Similarly, unique MAC addresses are also allocated to the handset device 70 and the handset device 80 (e.g. "BB . . . " and "CC . . . ").

The username 312 is the name of the user who is using the respective handset devices 50, 70 and 80. In this embodiment, the username for the handset device 50 is "XXX", the username for the handset device 70 is "YYY", and the username for the handset device 80 is "ZZZ". Further, in this embodiment, one of three types of statuses (i.e. offline, online, search) may be used. The status 'offline' indicates a state in which there is no response to a below-described wireless communication executed by the base device 20. Furthermore, this status also includes the circumstance in which the above handset device has moved to another extension network, such as to the extension network 210. The status 'online' indicates a state in which the base device 20 is able to communicate wirelessly. The status 'search' will be explained below. The handset device information storage area 30 is updated each time a handset device receives a call request (INVITE). The manner in which the association information 300, 302, 304 are stored in the handset device information storage area 30 will be explained in detail below.

The group storage area 32 stores the SIP URI for the extension network 210. Consequently, when an INVITE is received from the extension network 110, the base-side controller 22 is thereby able to send an INVITE to the extension network 210, send and receive a MESSAGE, and relay a voice data communication between the extension network 110 and the extension network 210. These operations will also be explained in detail below.

The program storage area 34 stores the program to be executed by the base-side controller 22. For example, the program storage area 34 stores a program for carrying out the telephone communications using SIP. The other storage device 36 may store information other than the information that is to be stored in the handset device information storage area 30, the group storage area 32, and the program storage area 34. The operation portion 38 has a plurality of keys. A user is able to input various information into the base device 20 by operating the operation portion 38. The display portion 40 is able to display a variety of information thereon.

(Handset Device Configuration)

Figure 4:
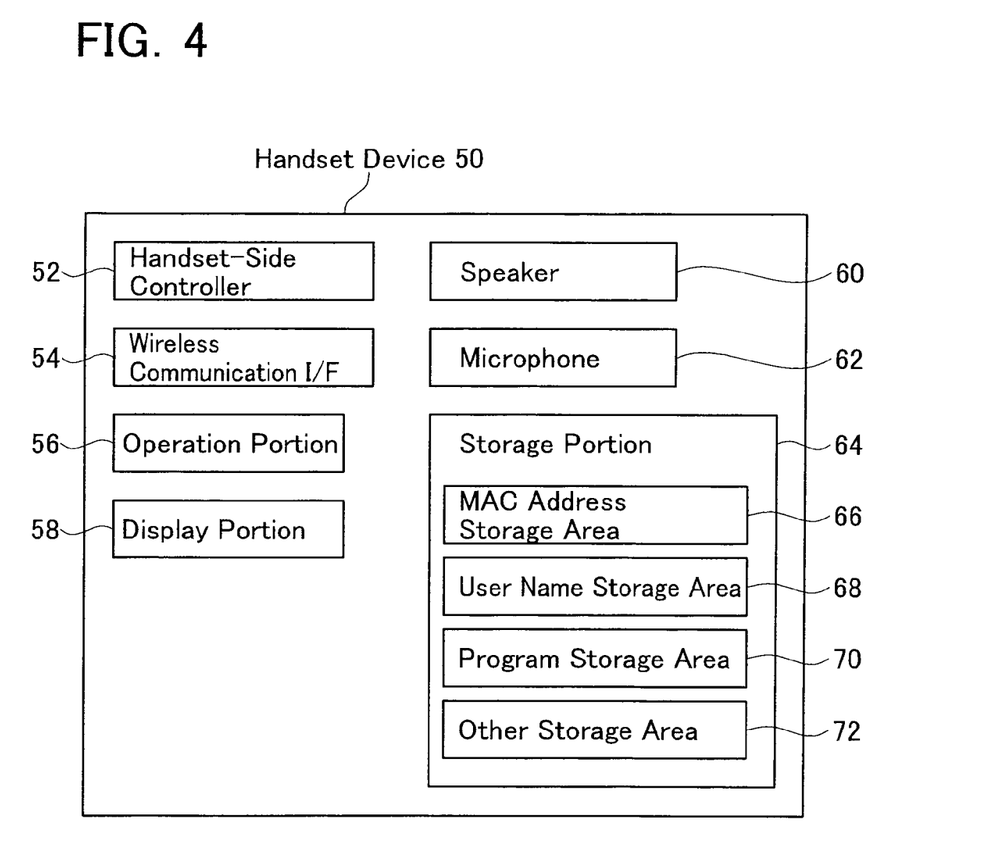
FIG. 4 shows an example of the configuration of the handset device.

Next, the configuration of the handset device 50 will be explained. The handset devices 70, 80 have the same configuration as the handset device 50. For this reason, detailed explanations of the handset devices 70, 80 shall be omitted. The handset device 50 of this embodiment is a cordless type. FIG. 4 shows the configuration of the handset device 50. The handset device 50 has a handset-side controller 52, a wireless communication interface 54, an operation portion 56, a display portion 58, a speaker 60, a microphone 62, and a storage portion 64. The handset-side controller 52 executes various processing in accordance with a program stored in the storage portion 64. The contents of the processing executed by the handset-side controller 52 will be explained below as needed. The wireless communication interface 54 is for wireless communication with the base device 20 (base device 220 in the case where the handset device moves to extension network 210).

The operation portion 56 has a plurality of keys. For example, the operation portion 56 has a hook key and numeric key pads. When not in use, the handset device 50 is in the on-hook state. A user may operate the hook key when using the handset device 50 to place a phone call. Consequently, the handset device 50 transitions to the off-hook state. Thereafter, the user inputs the telephone identification information (SIP URI) of the call request destination into the handset device 50 by operating the numeric key pads (or by operating the speed dial function). Consequently, the user is thereby able to place a phone call. Further, the user may set the handset device 50 to the off-hook state by operating the hook key while a telephone call is being placed to the handset device 50 (i.e. during a call request notice). Consequently, the user is thereby able to answer the telephone call. Hereinafter, setting the handset device 50 to the off-hook state when a call is being placed to the handset device 50 will be called the "call start operation". Further, the user may set the handset device 50 to the on-hook state by operating the hook key during calling (busy state). Consequently, the user is thereby able to disconnect the phone call. Hereinafter, setting the handset device 50 to the on-hook state in the busy state will be called the "call completion operation".

The display portion 58 is able to display a variety of information. The user may make a phone call using the speaker 60 and the microphone 62. The storage portion 64 has a MAC address storage area 66, a username storage area 68, a program storage area 70, and another storage area 72. The MAC address storage area 66 stores the MAC address (i.e. "AA . . . ") allocated to the handset device 50. The username storage area 68 stores the name of the user of handset device 50. The user may input the username into handset device 50 by operating the operation portion 56. A username inputted as such is stored in the username storage area 68. The program storage area 70 stores a program to be executed by the handset-side controller 52. The other storage area 72 may store information other than the information that is to be stored in the MAC address storage area 66, username storage area 68, and program storage area 70. For example, the other storage area 72 may store data created in the course of the handset-side controller 52 executing a process.

Furthermore, the base device 120 configuring the extension network 110 has the same configuration as the base device 20. The base device 120 is able to access the Internet 104 by way of a LAN line 102. Further, the handset devices 150, 160 belonging to the extension network 110 have the same configuration as the handset device 50.

Further, the base device 220 configuring the extension network 210 has the same configuration as the base device 20. The base device 220 is able to access the Internet 104 by way of a LAN line 202. Further, the handset device 250 belonging to the extension network 210 has the same configuration as the handset device 50.

(INVITE Receiving Process)

Next, the contents of the INVITE receiving process executed by the base-side controller 22 will be explained. FIGS. 5 through 8 show flowcharts of the INVITE receiving process. The base-side controller 22 monitors the reception of an INVITE (S10). For example, the user of the handset device 150 may place a phone call to the extension network 10 by inputting the SIP URI of the extension network 10 into the handset device 150. In so doing, an INVITE is sent to the SIP server 106 from the base device 120 of the extension network 110. This INVITE includes the SIP URI of the extension network 110, i.e. the source, and the SIP URI of the extension network 10, i.e. the destination. The SIP server 106, upon receiving the INVITE, transfers the INVITE to the extension network 10. In accordance with this, the base-side controller 22 makes a determination of YES in S10. Furthermore, the further explanation below is given with the example in which the INVITE is received in S10 in accordance with the handset device 150 placing a phone call to the extension network 10 in this embodiment.

Figure 5:
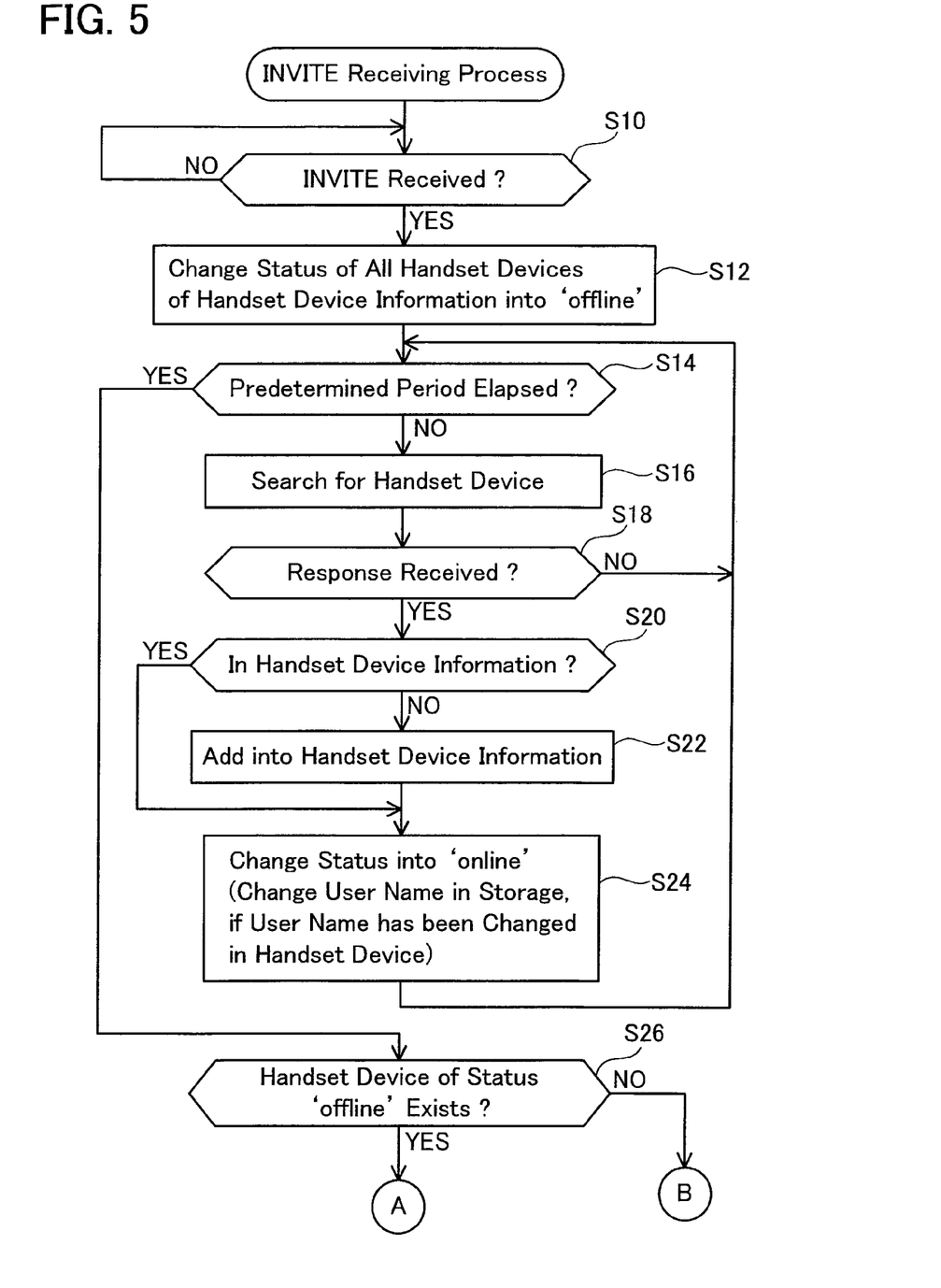
FIG. 5 shows a flowchart of an INVITE receiving process.

When the determination in S10 is YES, the base-side controller 22 changes the stored contents of the handset device information storage area 30 (S12). The handset device information, which was stored in accordance with the previous INVITE receiving process, is stored in the handset device information storage area 30. For example, in a case where the handset devices 50, 70, 80 existed in the area surrounding the base device 20 in the previous INVITE receiving process, the handset device information storage area 30 stores the association data (status 'online') related to these handset devices 50, 70, 80. In accordance therewith, the base-side controller 22 changes the status 314 of each of the handset devices 50, 70, 80 to 'offline' in S12.

Next, the base-side controller 22 determines whether or not a predetermined time period has elapsed since receiving the INVITE in S10 (S14). When the determination here is NO, the processing proceeds to S16. Conversely, when the determination here is YES, the processing proceeds to S26.

In S16, the base-side controller 22 sends a predetermined packet by means of wireless communication. This wireless communication is not sent to a specific party via a unicast, but rather is sent to the entire area within a predetermined range surrounding the base device 20. Consequently, the base-side controller 22 searches for a handset device that exists in the area surrounding the base device 20 (e.g. the handset devices 50, 70 and 80 in FIG. 1) (S16). Next, the base-side controller 22 determines whether or not a response has been received from the handset device that had been detected by the search (S18). This response includes the MAC address and username of the handset device. When the determination in S18 is NO, the processing returns to S14.

On the other hand, in a case where a response has been received from the handset device that had been detected by the search, the base-side controller 22 determines whether or not this handset device detected by the search is identical to one of the handset device that exists in the handset device information storage area 30 (S20). When the determination here is NO, the base-side controller 22 adds the handset device information of the handset device detected by the search to the handset device information storage area 30 (S22). Specifically, the base-side controller 22 secures an area for writing new association data into the handset device information storage area 30. Next, the base-side controller 22 writes the MAC address and username of the handset device detected by the search into the above area. When either S22 ends or the determination in S20 is YES, the base-side controller 22 changes the status 314 of the association data corresponding to the handset device detected by the search to 'online' (S24). In a case where the username is changed, the base-side controller 22 changes the username accordingly. When S24 ends, the processing returns to S14.

In S26, the base-side controller 22 determines whether or not a handset device having the status 'offline' exists (S26). The base-side controller 22 makes the determination of S26 by reading out the stored contents of the handset device information storage area 30. When the determination here is YES, the processing moves to S40 of FIG. 6. Conversely, when the determination here is NO, the processing moves to S44 of FIG. 6.

Figure 6:
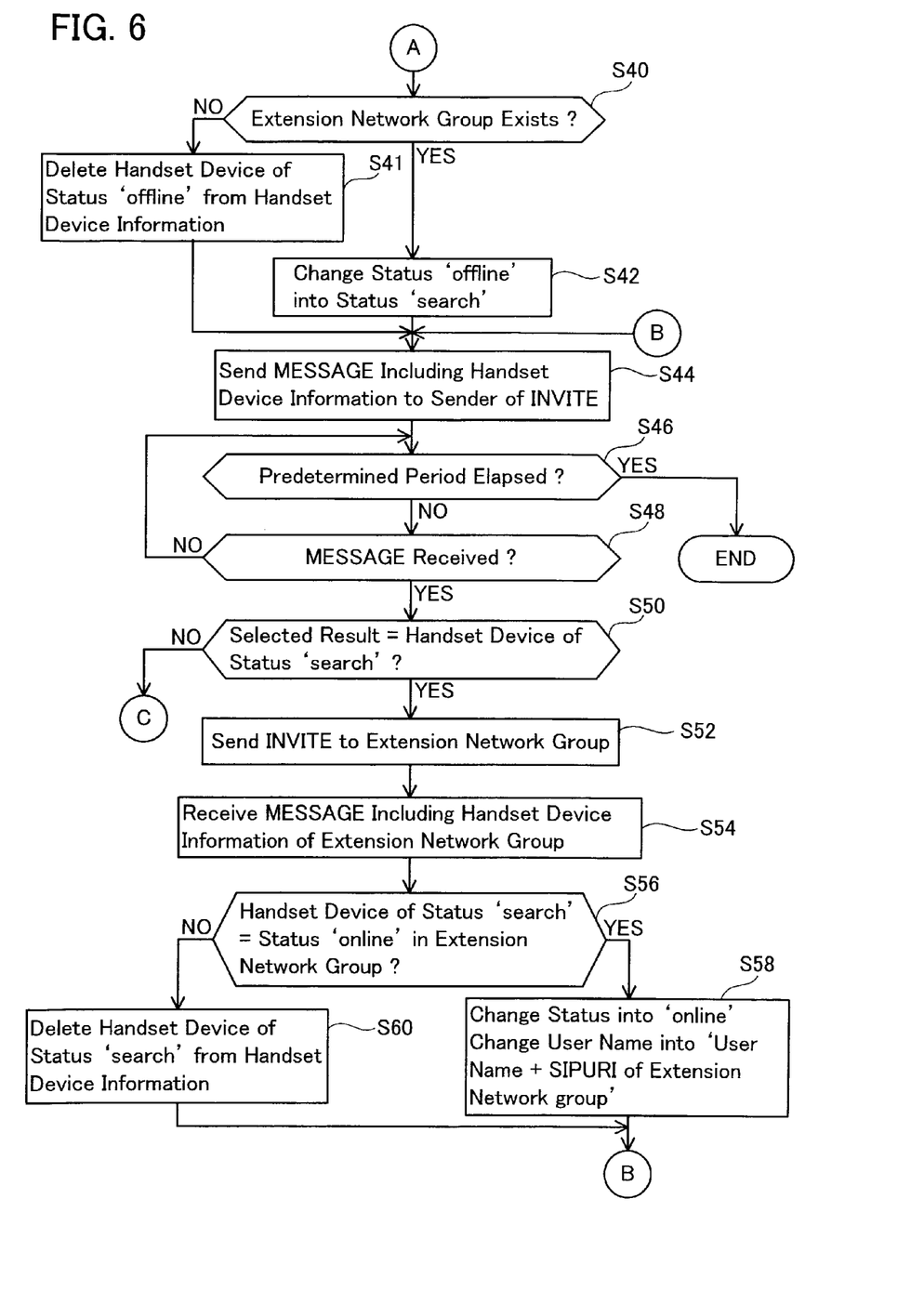
FIG. 6 is the continuation of the flowchart of FIG. 5.

In S40, the base-side controller 22 determines whether or not an extension network group exists in extension network 10. The base-side controller 22 makes the determination in S40 by reading out the stored contents of the group storage area 32. That is, in a case where the SIP URI is stored in the group storage area 32, the base-side controller 22 makes a determination of YES in S40. When the determination here is YES, the base-side controller 22 changes the stored contents of the handset device information storage area 30 (S42). Specifically, the base-side controller 22 changes the status 314 of the association data corresponding to the handset device having the status 'offline' to the status 'search'. For example, in a case where the handset device 80 is 'offline', the base-side controller 22 changes the status of the handset device 80 to 'search'. When S42 ends, the processing proceeds to S44.

On the other hand, when the determination in S40 is NO, that is, when an extension network group does not exist, the base-side controller 22 deletes the association data corresponding to the handset device of status 'offline' from the handset device information storage area 30 (S41). When S41 ends, the processing moves to S44.

In S44, the base-side controller 22 sends a MESSAGE to the sender of the INVITE (i.e. the extension network 110 in this embodiment). In this process, the base-side controller 22 creates text data including the respective association data stored in the handset device information storage area 30. That is, the text data includes character strings showing the handset device information, such as the user name 312 and the status 314 of each of the handset devices 50, 70, 80. Next, the base-side controller 22 uses a SIP MESSAGE command to send the text data to the sender of the INVITE. The MESSAGE is received by the SIP server 106, and the SIP server 106 transfers the MESSAGE to the base device 120.

The base device 120, upon receiving the MESSAGE, sends the text data included in this MESSAGE to the handset device 150 (the handset device on which the operation for placing the phone call to the extension network 10 was performed). As a result of this, the text data included in the MESSAGE is displayed on the handset device 150. That is, the MAC address, username and status (either one of two statuses ('online' and 'search')) of each of the handset devices are displayed. The user of the handset device 150 may execute an operation for selecting one of the handset devices based on the displayed contents. When this operation is executed, the handset device 150 sends the user-selected result (i.e. the MAC address and username of one handset device) to the base device 120. In accordance therewith, the base device 120 sends the MESSAGE including the user-selected result to the extension network 10. The MESSAGE is received by base device 20. A determination of YES is made in S48 in this case.

The base-side controller 22 monitors to determine whether or not a predetermined time period has elapsed subsequent to the MESSAGE having been sent in S44 (S46). When the determination here is YES, the INVITE receiving process ends. Conversely, when the determination in S46 is NO, the base-side controller 22 determines whether or not the MESSAGE including the above selected result has been received from the sender of the INVITE (S48). When the determination here is NO, the processing returns to S46. On the other hand, when the determination in S48 is YES, the base-side controller 22 makes a determination as to whether or not the selected result included in the MESSAGE is a handset device with the status 'search' (S50). Furthermore, the further explanation below is given with the example in which the handset device 80 has the status 'search' in this embodiment.

When the determination in S50 is YES, that is, when the handset device 80 with the status 'search' is selected, the base-side controller 22 sends an INVITE to the extension network 210 (S52). As a result of this, the base device 220 of the extension network 210 executes the INVITE receiving process shown in FIGS. 5 through 8. That is, the base device 220 uses a wireless communication to search for a handset device that exists in its own surroundings (S16 of FIG. 5). Furthermore, the base device 220 sends a MESSAGE including association data corresponding to the handset device that exists in its own surroundings to the extension network 10. As a result of this, the MESSAGE including the handset device information of the extension network 210 is received by the extension network 10 (S54).

Next, a determination is made as to whether or not the handset device having the status 'search' (handset device 80 in this embodiment) has status 'online' in the extension network 210 (S56). Consequently, a determination is thereby made as to whether or not the handset device 80 from which a response had not been received in the extension network 10 exists in the extension network 210. When the determination here is YES, the base-side controller 22 changes the status of the handset device 80 to 'online', and changes the user name to 'username+SIP URI of the extension network group', for example, 'ZZZ+SIP URI of the extension network 210'. Conversely, when the determination in S56 is NO, the base-side controller 22 deletes the association data 304 corresponding to the handset device 80 from the handset device information storage area 30. The stored contents of the handset device information storage area 30 are updated when S58 and S60 are executed. Then, the base-side controller 22 sends a MESSAGE including the updated handset device information to the extension network 110 (S44). As a result of this, one of the handset devices is selected once again by the handset device 150 of the extension network 110. In accordance therewith, a MESSAGE including the selected result is received by the handset device 150 (YES in S48).

Figure 7:
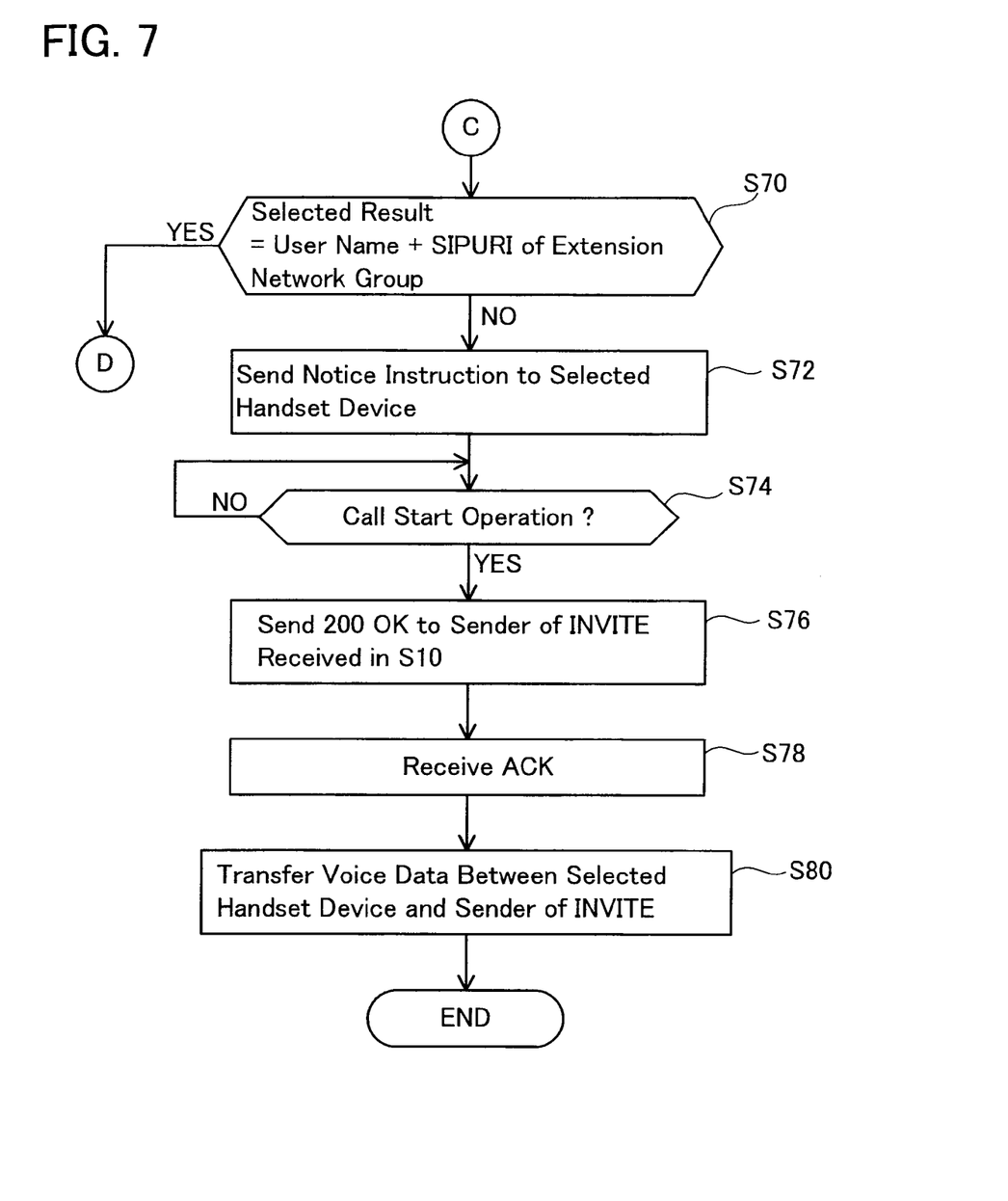
FIG. 7 is the continuation of the flowchart of FIG. 6.

When the determination in S50 is NO, that is, when the selected result includes the status 'online', the processing moves to S70 of FIG. 7. For example, the status of the handset device 80 is changed to 'online' in the above updated handset device information. When the handset device 80 is selected by the handset device 150 of the extension network 110, the determination in S50 becomes NO, and thus the processing moves to S70.

In S70 of FIG. 7, the base-side controller 22 determines whether or not the selected result received in S48 is the 'username+SIP URI of the extension network group'. In other words, the base-side controller 22 determines if the user-selected handset device is a handset device that exists in the extension network 10 or a handset device that exists in the extension network 210. When the determination here is NO, that is, when the selected result is a handset device of the extension network 10, it is possible to establish a communication session, which shall be explained hereinbelow, between the extension network 10 and the extension network 110. On the other hand, when the determination in S70 is YES, that is, when the selected result is a handset device of the extension network 210, a communication session is established not only between the extension network 10 and the extension network 110 but also between the extension network 10 and the extension network 210. In this case, the extension network 10 relays the call (voice data communication) between the extension network 110 and the extension network 210.

When the determination in S70 is NO, the base-side controller 22 sends a call request notice instruction by means of a wireless communication to the handset device included in the selected result received in S48 (for example, handset device 50) (S72). As a result of this, a call request notice is executed on the handset device 50. For example, a ringing sound is outputted. The user of the handset device 50 knows that a phone call is incoming. The user may perform the call start operation on the handset device 50. In accordance therewith, the handset device 50 sends to the base device 20 information denoting that the call start operation has been performed. This information includes the MAC address of handset device 50. Consequently, the base device 20 knows that the call start operation was performed on the handset device 50. The base-side controller 22 monitors the call start operation performed on the handset device 50 (S74). When the call start operation has been performed, the base side controller 22 sends a '200 OK' as the response to the INVITE received in S10 (S76).

Furthermore, when the description reads "sends Y as the response to X" in this embodiment, this signifies that Y includes information specifying that Y is the response to X, information regarding the source of Y (i.e. the destination of X) and information regarding the destination of Y (i.e. the source of X). For example, when the above description reads "sends a '200 OK' as the response to an INVITE", the '200 OK' includes information specifying that the '200 OK' is the response to the INVITE, the SIP URI of the extension network 10, which is the source of '200 OK', and the SIP URI of the extension network 110, which is the destination of the '200 OK'. The '200 OK' is sent to the base device 120 by way of the SIP server 106. As a result of this, the base device 120 sends an 'ACK'. The 'ACK' is received by the base device 20 (S78). Consequently, an RTP (Real-time Transport Protocol) communication session for a voice data communication is established between the base device 20 and the base device 120. Next, the base-side controller 22 relays the voice data communication between the handset device included in the selected result received in S48 (for example, the handset device 50) and the base device 120 (S80). That is, the base-side controller 22 transfers the voice data sent from the base device 120 to the handset device 50, and further transfers the voice data sent from the handset device 50 to the base device 120. Furthermore, the base device 120 transfers the voice data sent from the base device 20 to the handset device 150, and transfers the voice data sent from the handset device 150 to the base device 20. Consequently, it is thereby possible to establish a call between the handset device 50 and the handset device 150.

Figure 8:
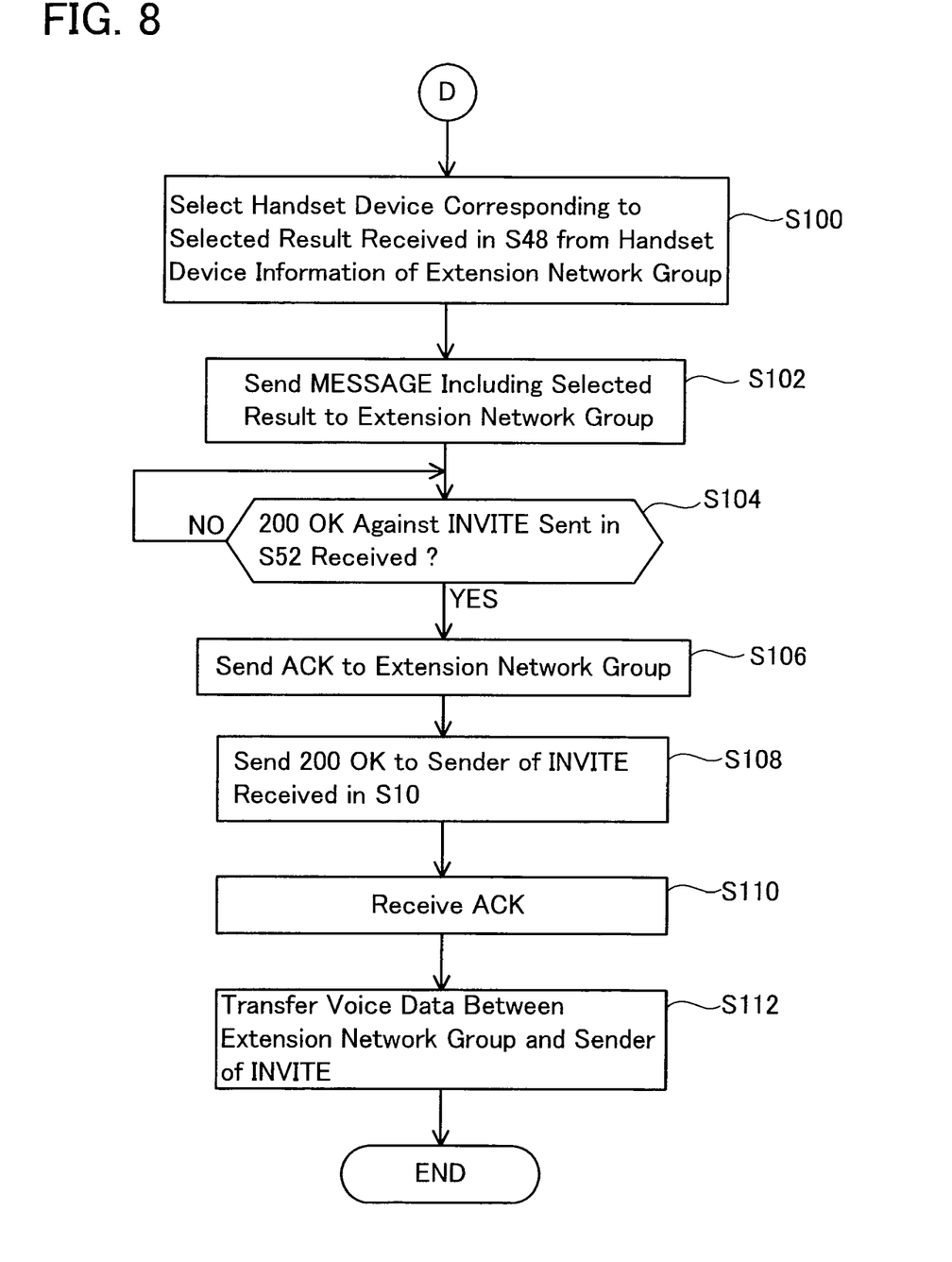
FIG. 8 is the continuation of the flowchart of FIG. 7.

On the other hand, when the determination in S70 is YES, that is, when the handset device included in the selected result received in S48 of FIG. 6 exists in the area surrounding the extension network 210, the processing moves to S100 of FIG. 8. For example, in a case where the handset device 80 exists in the area surrounding the extension network 210 and the selected result received in S48 is the handset device 80, a determination of YES is made in S70 and the processing moves to S100.

In S100, the base-side controller 22 selects the selected result received in S48 (for example, the handset device 80) from among the group of handset devices of the extension network 210 received in S54 of FIG. 6. Next, the base-side controller 22 sends a MESSAGE including the above selected result to the extension network 210 (S102). As a result of this, the base device 220 of the extension network 210 sends a call request notice instruction to the handset device 80 (S72 of FIG. 7). Consequently, a call request notice is executed on the handset device 80. The user of the handset device 80 may perform the call start operation. In accordance therewith, the handset device 80 sends information denoting that the call start operation has been performed on the base device 220. Consequently, the base device 220 sends the '200 OK' as the response to the INVITE sent from the base device 20 in S52 of FIG. 6. The base-side controller 22 monitors the reception of this '200 OK' (S104). When the determination here is YES, the base-side controller 22 sends the 'ACK' to the extension network 210 (S106). Consequently, a RTP communication session is established between the base device 20 and the base device 220.

Next, the base-side controller 22 sends the '200 OK' as the response to the INVITE received in S10 (S108). The '200 OK' is sent to the base device 120 by way of the SIP server 106. As a result of this, the base device 120 sends an 'ACK'. The 'ACK' is received by the base device 20 (S110). Consequently, the RTP communication session is established between the base device 20 and the base device 120. Next, the base-side controller 22 relays voice data communications between the extension network 110 and the extension network 210 (S112). That is, the base-side controller 22 transfers the voice data sent from the base device 120 to the base device 220, and also transfers the voice data sent from the base device 220 to the base device 120. Furthermore, the base device 120 transfers the voice data sent from the base device 20 to the handset device 150, and also transfers the voice data sent from the handset device 150 to the base device 20. Further, the base device 220 transfers the voice data sent from the base device 20 to the handset device 80, and also transfers the voice data sent from the handset device 80 to the base device 20. Consequently, it is thereby possible establish a call between the handset device 80 that exists in the extension network 210 and the handset device 150 of the extension network 110.

In this embodiment, the base device 20 of the extension network 10 is able to send information (the handset device information) regarding a plurality of handset devices that exists in its own surroundings to the sender of an INVITE (for example, the extension network 110). This handset device information is sent as text data. Data communication is able to be carried out faster than a case in which voice data, such as a voice message, is sent. For this reason, the sender of the INVITE is able to obtain the handset device information of the extension network 10 at high speed. The user being the sender of the INVITE is able to specifically select one of the handset devices of the party he wishes to call in accordance with the handset device information of the extension network 10. A call request notice is executed specifically on the handset device corresponding to this selected result in the extension network 10. According to the system 2 of this embodiment, it is possible to execute a call request notice that reflects the caller's intention. Further, in this embodiment, the extension network 210 is set up as being in the group of extension network 10. Even if the handset device 80, which earlier had existed in the extension network 10, moves to the extension network 210, the base device 20 of the extension network 10 is able to execute a search to determine whether or not the handset device 80 exists in the extension network 210. The base device 20 is able to send the handset device information including the result of this search to the sender of the INVITE. In a case where the handset device 80 is selected by the sender of the INVITE, the voice data communication is carried out between the sender of the INVITE and the extension network 210 while being relayed through the base device 20. That is, the base device 20 functions as a relay device for the voice data communication between the sender of the INVITE and the extension network 210. An unprecedented new system 2 is thereby constructed. Further, in this embodiment, association data corresponding to a handset device of status 'offline' is deleted from the handset device information storage area 30 in S41 of FIG. 6. Further, in S60, association data corresponding to a handset device of status 'search' is deleted from the handset device information storage area 30. Even if a handset device having the status 'offline' is selected by the sender of the INVITE, it is not possible to execute a call request notice on this handset device unless this handset device exists in the extension network group. A handset device with which a call cannot be established is deleted in S41 and S60, thereby the deleted handset device is not included in the list sent to the sender of the INVITE. For this reason, the caller is able to select a handset device more easily than making a selection from a list that includes a handset device with which a call cannot be established.

Variations of the above embodiment are given below as examples:

(1) In the above embodiment, all of the handset devices 50, 70, 80 configuring the extension network 10 are the cordless type. However, a handset device that is connected to the base device 20 via a wire can be added (hereinafter called a wired type handset device). The expression "the wired type handset device is executing a call request notice", for example, signifies that a ringing sound is being outputted from the speaker disposed in the base device 20. In order to realize this, the base-side controller 22 may send a call request notice instruction to the sound output circuit so that the above sound is outputted from the speaker disposed in the base device 20. When these configurations are employed, the expression "send a call request notice instruction to the wired type handset device sends" signifies the sending of the call request notice instruction to the above sound output circuit. That is, the above sound output circuit can be considered to be one element configuring the wired type handset device.

(2) Further, in the above embodiment, for example, in a case where the handset device 50 does not have status 'online' in either the extension network 10 or the extension network 210, the handset device information of the handset device 50 is deleted from the handset device information storage area 30. However, the configuration may be such that when the handset device 50 has been pre-registered in the handset device information storage area 30, the handset device 50 is not deleted even in a case like that mentioned above. When this configuration is employed, the determination made in S20 of FIG. 5 is always YES for a handset device that has been pre-registered in the handset device information storage area 30, and processing skips S22 and moves to S24. Further, the status of a handset device was explained as being any one of 'online', 'search' and 'offline', but the present invention is not limited thereto, and, for example, if a handset device is busy (talking, notifying a call request), information to that effect may be stored in the handset device information storage area 30 as the status. Further, if the status of a handset device is able to be set in this handset device by the user, the set contents (for example, busy, out of the office, and so forth) may be stored in the handset device information storage area 30 as the status.

(3) Further, base device 20 may create text data including all the handset devices included in the MESSAGE received in S54 of FIG. 6, and may send the MESSAGE including this text data to the sender of the INVITE (S44). That is, the base device 20 may send to the sender of the INVITE text data including information related to all of the handset devices that exist in its own surroundings, and information related to all of the handset devices that exist in the area surrounding the base device 220. In a case where a handset device that exists in the area surrounding the base device 220 is selected by the sender of the INVITE, the base device 20 functions as a relay device for a voice data communication between the sender of the INVITE and the base device 220.

A part of technique disclosed in the embodiment will be described. For example, the telephone device may be a base device with which one or more handset devices can be utilized together. In this case, the receiver device of the base device may be a cordless type (e.g. identical to the handset device), or alternatively, may be a configuration that is connected with the base device main unit via a wire. In the former case, for example, the first call request notice instruction sending device may send a call request notice instruction to the receiver device of the base device. Alternately, in the latter case, for example, the first call request notice instruction sending device may send a call request notice instruction to a sound output circuit that outputs a sound from a speaker of the base device main unit. In this case, the above-mentioned sound output circuit may be considered to be one element configuring the receiver device of the base device.

The above IP telephone device may further comprise a wireless communication interface. This wireless communication interface may perform wireless communications with a receiver device that exists within a predetermined range surrounding the IP telephone device. The identification information obtaining device may obtain the identification information of each of the plurality of receiver devices by wirelessly communicating by means of the wireless communication interface.

Furthermore, the identification information obtaining device may obtain the identification information of each of the plurality of receiver devices that exists within the predetermined range of itself by wirelessly communicating with these receiver devices on a regular basis. However, according to this configuration, for example, there may be a situation in which a receiver device that had existed within the predetermined range at the time of the most recent wireless communication could move outside the predetermined range, and receive the call request thereafter. In this case, the identification information obtained via the most recent wireless communication and the state of the area surrounding the IP telephone device at the time at which the call request is received will not be identical. According to this configuration, it is not possible to provide the sender of the call request with the most recent information at the time at which the call request is received. With the foregoing point in view, the following configuration may be used. That is, the identification information obtaining device may obtain the identification information of each of the plurality of receiver devices on a condition that the call request receiving device receives the call request. According to this configuration, it is possible to provide the sender of the call request with the most recent information at the time at which the call request is received.

The above IP telephone device may further comprise a status obtaining device. The status obtaining device may be configured to obtain the status of each of the plurality of receiver devices. The text data creation device may create the text data including association data of each of the plurality of receiver devices. Each piece of association data may be an association of the identification information of the receiver device and the status of the receiver device. Furthermore, for example, the "status" may be one of two types of statuses: the busy status and the idle status. Further, for example, any of three or more types of statuses may also be used (for example, power OFF status, busy status, call request sending status, call request notifying status, and idle status). Further, a first status may be used for a receiver device that exists at the time of the most recent (current) wireless communication, and a second status may be used for a receiver device that had existed at the time of the previous wireless communication, but does not exist at the time of the current wireless communication. According to this configuration, it is possible to provide the sender of the call request with the status information of each receiver device. The caller may select the receiver device that the caller wishes to call based on the status information of each receiver device.

Furthermore, an IP telephone network system comprising the above IP telephone device (shall be called the "first IP telephone device" hereinafter) and another IP telephone device (shall be called the "second IP telephone device" hereinafter) may also be constructed. In so doing, the first IP telephone device may further comprise a second identification information receiving device, a command sending device, and a second voice data transferring device. The second identification information receiving device may be configured to receive identification information of a receiver device sent from the second IP telephone device. The text data creation device may create the text data including the identification information of each of the plurality of receiver devices obtained by the identification information obtaining device, and the identification information received by the second identification information receiving device.

The first call request notice instruction sending device may be configured to send the first call request notice instruction to the receiver device corresponding to the identification information received by the first identification information receiving device on a condition that the identification information received by the first identification information receiving device is any of the identification information of each of the plurality of receiver devices obtained by the identification information obtaining device. The command sending device may be configured to send a command including the identification information received by the first identification information receiving device to the second IP telephone device on a condition that the identification information received by the first identification information receiving device is identical to the identification information received by the second identification information receiving device. The second voice data transferring device may be configured to transfer voice data sent from the second IP telephone device to the sender of the call request, and to transfer voice data sent from the sender of the call request to the second IP telephone device.

The above-mentioned second IP telephone device may comprise an identification information sending device, a command receiving device, a second call request notice instruction sending device, and a third voice data transferring device. The identification information sending device may be configured to send the identification information of the receiver device to the first IP telephone device. The command receiving device may be configured to receive the command sent from the first IP telephone device. The second call request notice instruction sending device may be configured to send a second call request notice instruction to a receiver device corresponding to the identification information included in the command received by the command receiving device. The third voice data transferring device may be configured to transfer voice data sent from the receiver device that has been the destination of the second call request notice instruction to the first IP telephone device, and to transfer voice data sent from the first IP telephone device to the receiver device that has been the destination of the second call request notice instruction.

According to the above configuration, it is possible to send identification information of a receiver device belonging to the second IP telephone device (for example, a receiver device that exists in the area surrounding the second IP telephone device) to the sender of the call request which is sent to the first IP telephone device. When the sender of the call request selects a receiver device belonging to the second IP telephone device, the call request notice is executed on this receiver device. When a user performs a call start operation, the first IP telephone device functions as a relay device for the voice data communication between the sender of the call request and the second IP telephone device. According to this technology, it is possible to construct a new system that is capable of executing a call request notice that reflects the intention of the caller.

The following IP telephone network system is also disclosed in this specification. This IP telephone network system may comprise a first IP telephone device and a second IP telephone device. The first IP telephone device may comprise a first wireless communication interface, a first identification information obtaining device, a first command sending device, a second command receiving device, a text data creation device, a call request receiving device, a text data transferring device, an identification information receiving device, a first call request notice instruction sending device, a first voice data transferring device, a third command receiving device, and a second voice data transferring device.

The first wireless communication interface may be used for wirelessly communicating with a receiver device existing within a predetermined range surrounding the first IP telephone device. The first identification information obtaining device may be configured to obtain the identification information of a receiver device by wirelessly communicating by means of the first wireless communication interface. The first command sending device may be configured to send a first command to the second IP telephone device. The second command receiving device may be configured to receive a second command sent from the second IP telephone device.

The text data creation device may be configured to create the text data including the identification information obtained by the first identification information obtaining device and the identification information included in the second command received by the second command receiving device. For example, the text data creation device may create the text data including all the identification information included in the second command, and alternately may create the text data including a portion of the identification information included in the second command.

The call request receiving device may be configured to receive a call request. The text data sending device may be configured to send the text data to the sender of the call request. The identification information receiving device may be configured to receive at least one piece of identification information selected in the sender of the call request in accordance with the text data. The first call request notice instruction sending device may be configured to send a first call request notice instruction by means of the first wireless communication interface to a receiver device corresponding to the identification information received by the identification information receiving device on a condition that the identification information received by the identification information receiving device is identical to the identification information obtained by the first identification information obtaining device. As a result of this, a call request notice instruction is executed in the destination of the first call request notice instruction. The user may perform a call start operation. The first voice data transferring device may be configured to transfer voice data sent from the receiver device that has been the destination of the first call request notice instruction to the sender of the call request, and to transfer voice data sent from the sender of the call request to the receiver device that has been the destination of the first call request notice instruction.

The third command sending device may be configured to send a third command including the identification information received by the identification information receiving device to the second IP telephone device on a condition that the identification information received by the identification information receiving device is identical to the identification information included in the second command received by the second command receiving device. The second voice data transferring device may be configured to transfer voice data sent from the second IP telephone device to the sender of the call request, and to transfer voice data sent from the sender of the call request to the second IP telephone device.

The second IP telephone device may comprise a second wireless communication interface, a second identification information obtaining device, a first command receiving device, a response sending device, a third command receiving device, a second call request notice instruction sending device, and a third voice data transferring device.

The second wireless communication interface may be used for wirelessly communicating with a receiver device existing within a predetermined range surrounding the second IP telephone device. The second identification information obtaining device may be configured to obtain the identification information of a receiver device by wirelessly communicating by means of the second wireless communication interface. The first command receiving device may be configured to receive the first command sent from the first IP telephone device. The response sending device may be configured to send the second command including the identification information of the receiver device obtained by the second identification obtaining device to the first IP telephone device on a condition that the first command receiving device receives the first command.

The third command receiving device may be configured to receive the third command sent from the first IP telephone device. The second call request notice instruction sending device may be configured to send a second call request notice instruction by means of the second wireless communication interface to a receiver device corresponding to the identification information included in the third command on a condition that the third command receiving device receives the third command. As a result of this, a call request notice is executed by the destination of the second call request notice instruction. The user may perform a call start operation. The third voice data transferring device may be configured to transfer voice data sent from the receiver device that has been the destination of the second call request notice instruction to the first IP telephone device, and to transfer voice data sent from the first IP telephone device to the receiver device that has been the destination of the second call request notice instruction.

According to the above system, the first IP telephone device is able to obtain the identification information not only of a receiver device that exists in its own surroundings, but also of a receiver device that exists in the area surrounding the second IP telephone device. For example, even if a receiver device that has existed in the area surrounding the first IP telephone device is moved to the area surrounding the second IP telephone device (the receiver device of which shall be called the "mobile calling device" hereinafter), it is possible to send the text data including the identification information of the mobile calling device to the sender of the call request. When the sender of the call request selects the mobile calling device, a call request notice is executed on the mobile calling device. When the user performs a call start operation on the mobile calling device, the first IP telephone device functions as a relay device for voice data communication between the sender of the call request and the second IP telephone device. According to this configuration, it is possible to construct a new system capable of executing a call request notice that reflects the intention of the caller. Further, according to the above configuration, for example, it is possible for the caller to place a call to the receiver device that the caller wishes to call when this receiver device exists in both the area surrounding the first IP telephone device and the area surrounding the second IP telephone device.

The first command sending device may send the first command to the second IP telephone device each time the call request is received by the call request receiving device. Further, for example, in a case where a receiver device belonging to the first IP telephone device is registered beforehand in the first IP telephone device, the first command sending device may send the first command to the second IP telephone device when the registered receiver device has not been obtained by the first identification information obtaining device. Further, the following configuration may also be used. That is, the first identification information obtaining device may obtain the identification information of a receiver device by means of the first wireless communication interface on a condition that the call request receiving device receives the call request. The first command sending device may be configured to send the first command to the second IP telephone device on a condition that predetermined identification information exists. The predetermined identification information may be defined as follows: (1) identification information obtained by the first identification information obtaining device when a call request had been received at the last time, and, moreover, (2) identification information that is not obtained by the first identification information obtaining device when a call request is received at this time. Furthermore, the above expression "on a condition that . . . " as used herein signifies that this condition is a minimum requirement, and does not exclude other conditions from being added. For example, the first command sending device may send the first command to the second IP telephone device when the predetermined identification information exists, and when the predetermined identification information is selected by the sender of the call request. The text data creation device may be configured to create the text data including the predetermined identification information on a condition that the second command received by the second command receiving device includes the predetermined identification information.

In a case where the second command received by the second command receiving device includes identification information other than the predetermined identification information, the text data creation device may be configured to create the text data that does not include identification information other than the predetermined identification information. According to this configuration, a receiver device, which existed in the area surrounding the second IP telephone device at the time the call request was received at the last time, and also exists in the area surrounding the second IP telephone device at the time the call request is received at this time, is not included in the text data. That is, a receiver device that is inferred to be unrelated to the first IP telephone device is not included in the text data.

The IP telephone device may carry out telephone communication using the SIP (Session Initiation Protocol). Other protocols may also be used. For example, "H.323", "MGCP (Media Gateway Control Protocol)", "H.248/MEGACO (Media Gateway Control)" and the like may also be used.

The call request may be an INVITE command. Further, the text data may be sent in accordance with a SIP MESSAGE command. Further, selected result information for the text data may be sent in accordance with the SIP MESSAGE command. In this case, the selected result information may be sent as text data.

What is claimed is:

1. An IP telephone device configured to utilize an IP telephone network, the IP telephone device comprising:
   an identification information obtaining device configured to obtain identification information of each of a plurality of receiver devices;
   a text data creation device configured to create text data including the identification information of each of the plurality of receiver devices;
   a call request receiving device configured to receive a call request;
   a text data sending device configured to send the text data to a sender of the call request;
   a first identification information receiving device configured to receive at least one piece of identification information selected by the sender of the call request in accordance with the text data;
   a first call request notice instruction sending device configured to send a first call request notice instruction to a receiver device corresponding to the identification information received by the first identification information receiving device; and
   a first voice data transferring device configured to transfer voice data sent from the receiver device which has been a destination of the first call request notice instruction to the sender of the call request, and transfer voice data sent from the sender of the call request to the receiver device which has been the destination of the first call request notice instruction.

2. The IP telephone device as in claim 1, further comprising:
   a wireless communication interface configured to wirelessly communicate with a receiver device existing within a predetermined range surrounding the IP telephone device,
   wherein the identification information obtaining device is configured to obtain the identification information by wirelessly communicating by means of the wireless communication interface.

3. The IP telephone device as in claim 2, wherein
   the identification information obtaining device is configured to obtain the identification information by wirelessly communicating by means of the wireless communication interface on a condition that the call request receiving device receives the call request.

4. The IP telephone device as in claim 1, further comprising:
   a status obtaining device configured to obtain a status of each of the plurality of the receiver devices,
   wherein the text data creation device is configured to create the text data including association data for each of the plurality of receiver devices, and
   each association data is an association of the identification information and the status of the receiver device.

5. An IP telephone network system comprising:
   the IP telephone device as in claim 1; and
   another IP telephone device configured to utilize the IP telephone network,
   wherein the IP telephone device further comprises a second identification information receiving device, a command sending device, and a second voice data transferring device,
   the second identification information receiving device is configured to receive identification information of a receiver device sent from the other IP telephone device,
   the text data creation device is configured to create the text data including the identification information of each of the plurality of the receiver devices obtained by the identification information obtaining device and the identification information of the receiver device received by the second identification information receiving device,
   the first call request notice instruction sending device is configured to send the first call request notice instruction to the receiver device corresponding to the identification information received by the first identification information receiving device on a condition that the identification information received by the first identification information receiving device is identical to any of the identification information of each of the plurality of the receiver devices obtained by the identification information obtaining device,
   the command sending device is configured to send a command including the identification information received by the first identification information receiving device to the other IP telephone device on a condition that the identification information received by the first identification information receiving device is identical to the identification information received by the second identification information receiving device, and
   the second voice data transferring device is configured to transfer voice data sent from the other IP telephone device to the sender of the call request, and transfer voice data sent from the sender of the call request to the other IP telephone device,
   wherein the other telephone device comprises:
   an identification information sending device configured to send the identification information of the receiver device to the IP telephone device;
   a command receiving device configured to receive the command sent from the IP telephone device;
   a second call request notice instruction sending device configured to send a second call request notice instruction to a receiver device corresponding to the identification information included in the command received by the command receiving device; and
   a third voice data transferring device configured to transfer voice data sent from the receiver device which has been a destination of the second call request notice instruction to the IP telephone device, and transfer voice data sent from the IP telephone device to the receiver device which has been the destination of the second call request notice instruction.

6. An IP telephone network system comprising:
a first IP telephone device configured to utilize an IP telephone network; and
a second IP telephone device configured to utilize the IP telephone network,
wherein the first IP telephone device comprises:
a first wireless communication interface configured to wirelessly communicate with a receiver device existing within a predetermined range surrounding the first IP telephone device;
a first identification information obtaining device configured to obtain identification information of a receiver device by wirelessly communicating by means of the first wireless communication interface;
a first command sending device configured to send a first command to the second IP telephone device;
a second command receiving device configured to receive a second command sent from the second IP telephone device;
a text data creation device configured to create text data including the identification information obtained by the first identification information obtaining device and identification information included in the second command received by the second command receiving device;
a call request receiving device configured to receive a call request;
a text data sending device configured to send the text data to a sender of the call request;
an identification information receiving device configured to receive at least one piece of identification information selected in the sender of the call request in accordance with the text data;
a first call request notice instruction sending device configured to send a first call request notice instruction by means of the first wireless communication interface to a receiver device corresponding to the identification information received by the identification information receiving device on a condition that the identification information received by the identification information receiving device is identical to the identification information obtained by the first identification information obtaining device;
a first voice data transferring device configured to transfer voice data sent from the receiver device which has been a destination of the first call request notice instruction to the sender of the call request, and transfer voice data sent from the sender of the call request to the receiver device which has been the destination of the first call request notice instruction;
a third command sending device configured to send a third command including the identification information received by the identification information receiving device to the second IP telephone device on a condition that the identification information received by the identification information receiving device is identical to the identification information included in the second command received by the second command receiving device; and
a second voice data transferring device configured to transfer voice data sent from the second IP telephone device to the sender of the call request, and transfer voice data sent from the sender of the call request to the second IP telephone device,
wherein the second IP telephone device comprises:
a second wireless communication interface configured to wirelessly communicate with a receiver device existing within a predetermined range surrounding the second IP telephone device;
a second identification information obtaining device configured to obtain identification information of a receiver device by wirelessly communicating by means of the second wireless communication interface;
a first command receiving device configured to receive the first command sent from the first IP telephone device;
a response sending device configured to send the second command including the identification information of the receiver device obtained by the second identification information obtaining device to the first IP telephone device on a condition that the first command receiving device receives the first command;
a third command receiving device configured to receive the third command sent from the first IP telephone device;
a second call request notice instruction sending device configured to send a second call request notice instruction by means of the second wireless communication interface to a receiver device corresponding to the identification information included in the third command received by the third command receiving device; and
a third voice data transferring device configured to transfer voice data sent from the receiver device which has been a destination of the second call request notice instruction to the first IP telephone device, and transfer voice data sent from the first IP telephone device to the receiver device which has been the destination of the second call request notice instruction.

7. The IP telephone network system as in claim 6, wherein
the first identification information obtaining device is configured to obtain the identification information of the receiver device on a condition that the call request receiving device receives the call request,
the first command sending device is configured to send the first command to the second IP telephone device on a condition that predetermined identification information exists, and
the predetermined identification information is defined as:
(1) identification information obtained by the first identification information obtaining device when a call request had been received at the last time; and
(2) identification information not obtained by the first identification information obtaining device when a call request is received at this time,
wherein the text data creation device is configured to create the text data including the predetermined identification information on a condition that the second command received by the second command receiving device includes the predetermined identification information.

8. The IP telephone network system as in claim 7, wherein in a case where the second command received by the second command receiving device includes identification information other than the predetermined identification information, the text data creation device is configured to create the text data which does not include the identification information other than the predetermined identification information.

* * * * *